3,312,173
ELECTRIC CIRCULATING PUMP
Claude Michel Brunau and Rolland Roger Désiré Jean Echard, Paris, France, assignors to International Standard Electric Corporation, New York, N.Y., a corporation of Delaware
Filed June 17, 1965, Ser. No. 464,674
Claims priority, application France, June 19, 1964, 978,846, Patent 1,407,851
1 Claim. (Cl. 103—53)

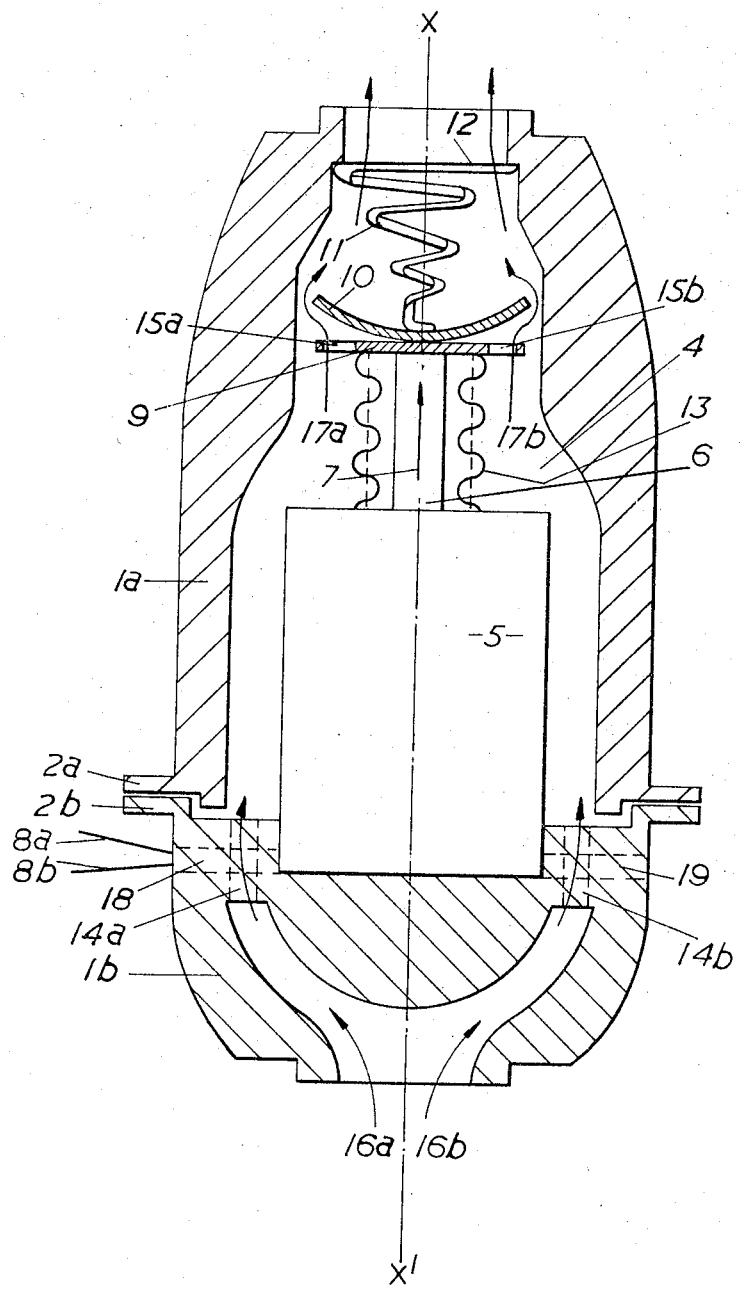

The present invention concerns a circulating pump for liquids which does not include a rotating motor, but rather an electro-magnet supplied by a pulsed current.

The circulating pumps used currently in central heating installations, and more generally in the applications where a pump must supply a pressure and a flow of low rate, usually comprise a centrifugal pump mounted directly on the armature of a low-power induction motor.

This arrangement presents a certain number of inconveniences:

Since the stator is insulated from the rotor by means of an amagnetic material which assures the tightness, the air gap is important thus entailing a decrease of the efficiency of the motor;

The armature is carried by two bearings which must be either water-tight or designed for operating in the liquid;

Since the speed of the induction motor is constant, there are no means for regulating the flow of the pump;

During the setting into operation, it must be ascertained that the direction of rotation of the motor enables a correct operation of the pump.

In the present invention, an electro-magnet with a plunging core located inside the cylindrical housing of the pump is used, the coil of the electro-magnet being supplied by pulsed current. A perforated end plate and an elastic disc both of circular form are fixed to the end of the plunger in such a way as to provoke a movement of the liquid in the column when said core is subjected to a reciprocating movement. In this arrangement, the core and the inside part of the coil may be separated from the fluid by means of elastic bellows fixed for instance by sticking. No bearings are necessary, the number of pieces is small, the apparatus is perfectly cylindrical, and the direction of the liquid flow is fixed by the way the elastic disc is fitted. Last, the flow of the pump may be very easily regulated by controlling the frequency of the current pulses.

The object of the present invention is thus to achieve a circulating pump for liquids of simple manufacture, and having a flow which is adjustable.

The present invention will be particularly described with reference to the accompanying drawings in which the figure represents a transverse section of the circulating pump according to the invention. It includes a pump housing made of two parts 1a and 1b which are fixed to each other by means of the respective circular flanges 2a and 2b, the tightness being assured by the annular joint.

An electro-magnet coil 5 of cylindrical form is disposed in the chamber 4 of the housing 1. This coil includes a plunger 6 which moves in the direction of the arrow 7 when the coil is energized by the passage of a current in the conductors 8a and 8b. The electro-magnet 5 is fixed by any suitable means (for instance by sticking with a thermo-setting resin) in a cylindrical recess of the lower part 1b of the pump housing, this mounting assuring the alignment of the longitudinal axis of the electromagnet with the axis X–X' of the circulating pump. The conductors 8a and 8b are brought out through a transverse hole made tight either by means of a cable gland or by means of thermo-setting resin. The upper part of the plunger 6 carries an end plate 9 and an elastic disc 10 both of circular form. An helicoidal spring of conical form 11 fixed on the upper part 12 of the housing 1a assures the return of the plunger 6 to its rest position when the electro-magnet 5 is de-energized. This electro-magnet 5 and the plunger 6 are protected from the liquid by a cylindrical bellows 13, this piece being made of rubber or of any other suitable elastic material. The cross sections for passage of the liquid through the apparatus are such that, when the electro-magnet is in the rest position, the circulation of the liquid may take place without hindrance (natural circulation in the case of a central heating installation initially designed for operating without a circulating pump). To that end, the part 1b of the chamber includes a series of holes on its periphery such as those indicated at 14a and 14b. The end plate 9 also includes peripheric holes such as those indicated at 15a and 15b which are freed when the elastic disc 10 is raised under the action of the movement of the liquid in the direction of the arrows 16a–16b and 17a–17b. When the electro-magnet 5 is energized, the plunger moves upwards as indicated on the figure, and the weight of the upper liquid column presses the disc 10 down over the end plate 9. This column is moved in the direction of the arrows 17a and 17b, and the lower liquid column also moves in the direction of the arrows 16a, 16b, thus assuring a forced circulation. When the electro-magnet is de-energized, the plunger 6 moves in the direction opposite to that of the arrow 7 under the impetus of the return spring 11 and comes to a rest position. During this movement, the elastic disc 10 rises and takes a curved form as shown in the figure, and the resistance opposed to the passage of the liquid is very small owing to the holes 15a and 15b provided in the plate 9. The backward movement of the liquid column is thus very small, the combination of the plate 9 and disc 10 operating in the same way as a valve which opens during the return path of the plunger 6.

It will be noticed that the assembly of the circulating pump by means of the flanges 2a and 2b permits quick dismantling, for instance for cleaning.

In an alternative embodiment, air cooling of the coil of the electro-magnet may be obtained by putting it in a chamber, by making provision for longitudinal ventilation ducts between the chamber and the coil, and by assuring communication between the plunger and the bottom of the chamber.

If this bottom communicates outwards through one or several longitudinal holes such as those shown at 18 and 19, the movement of the plunger will assure an air circulation over the peripheral wiring.

The circulating pump just described may be supplied either by direct-current or by alternating current pulsed signals, so that the frequency of these signals determines the control of the flow.

While the principles of the above invention have been described in connection with specific embodiments and particular modifications thereof, it is to be clearly understood that this description is made by way of example and not as a limitation of the scope of the invention.

What we claim is:

A fluid pump comprising a housing formed to provide a chamber therein with a fluid inlet and a fluid outlet, a solenoid with a reciprocable plunger placed in said chamber, said solenoid being adapted when energized to move said plunger axially in said chamber, a perforated circular plate and an elastic disc mounted at the end of the plunger, a return spring for bringing back the plunger to its original position when the solenoid is de-energized, and an elastic bellows fixed between said circular plate and an end of said solenoid, so that when the plunger moves in a first direction upon energization of said solenoid, the elastic disc is pressed by the fluid pressure against the plate and the column of the liquid moves in the same direction, and when the plunger moves in the opposite direction upon de-energization of said solenoid, said disc deflects and the column of liquid flows freely through the holes of the plate.

References Cited by the Examiner

UNITED STATES PATENTS

| 214,764 | 4/1879 | Fragan | 74—18.2 |
|---|---|---|---|
| 1,789,694 | 1/1931 | Beman | 230—55 |
| 1,888,322 | 11/1932 | Lanctot et al. | 103—151 X |
| 2,911,918 | 11/1959 | Reed | 103—87 |
| 3,174,433 | 3/1965 | Roosa | 103—151 X |

ROBERT M. WALKER, *Primary Examiner.*